United States Patent
Ovshinsky et al.

(10) Patent No.: US 6,536,487 B2
(45) Date of Patent: Mar. 25, 2003

(54) ATOMICALLY ENGINEERED HYDROGEN STORAGE ALLOYS HAVING EXTENDED STORAGE CAPACITY AT HIGH PRESSURES AND HIGH PRESSURE HYDROGEN STORAGE UNITS CONTAINING VARIABLE AMOUNTS THEREOF

(75) Inventors: Stanford R. Ovshinsky, Bloomfield Hills, MI (US); Rosa Young, Bloomfield Hills, MI (US); Baoquan Huang, Troy, MI (US)

(73) Assignee: Energy Conversion Devices, Inc., Rochester Hills, MI (US)

( * ) Notice: Subject to any disclaimer, the term of this patent is extended or adjusted under 35 U.S.C. 154(b) by 7 days.

(21) Appl. No.: 09/901,816

(22) Filed: Jul. 10, 2001

(65) Prior Publication Data

US 2002/0029821 A1 Mar. 14, 2002

Related U.S. Application Data

(63) Continuation-in-part of application No. 09/444,810, filed on Nov. 22, 1999, now Pat. No. 6,305,442, which is a continuation-in-part of application No. 09/435,497, filed on Nov. 6, 1999, now Pat. No. 6,193,929.

(51) Int. Cl.$^7$ .................................................. B65B 1/04
(52) U.S. Cl. ........................ 141/231; 141/82; 420/402; 420/407; 420/900
(58) Field of Search .............................. 141/1, 2, 3, 18, 141/82, 98, 231; 420/900, 402, 407; 429/20, 59, 19; 62/46.2; 290/4 R (56) References Cited

U.S. PATENT DOCUMENTS 6,193,929 B1 * 2/2001 Ovshinsky et al. .......... 420/402
6,305,442 B1 * 10/2001 Ovshinsky et al. ........... 141/18

* cited by examiner

Primary Examiner—Steven O. Douglas
(74) Attorney, Agent, or Firm—David W. Schumaker; Frederick W. Mau II; Marvin S. Siskind (57) ABSTRACT

Atomically engineered hydrogen storage alloys which include a spectrum of hydrogen bonding energies and multiple hydride phases which extends and enhances their storage capacity at high pressures and high pressure hydrogen storage units which contain a variable amount of these hydrogen storage alloys therein to enhance the storage capacity of the unit beyond that obtainable by conventional alloys or pressurized hydrogen gas alone.

42 Claims, 8 Drawing Sheets

ATOMICALLY ENGINEERED HYDROGEN STORAGE ALLOYS HAVING EXTENDED STORAGE CAPACITY AT HIGH PRESSURES AND HIGH PRESSURE HYDROGEN STORAGE UNITS CONTAINING VARIABLE AMOUNTS THEREOF

RELATED APPLICATIONS

The instant applications is a continuation-in-part of U.S. application Ser. No. 09/444,810 filed Nov. 22, 1999, now U.S. Pat. No. 6,305,442, which is a continuation-in-part of U.S. application Ser. No. 09/435,497, filed Nov. 6, 1999 now U.S. Pat. No. 6,193,929.

FIELD OF THE INVENTION

This invention relates generally to hydrogen storage units and alloys. More specifically this invention relates to hydrogen storage alloys which have been atomically engineered to include a spectrum of hydrogen bonding energies and multiple hydride phases which extend and enhance their storage capacity at high pressures. The invention also includes high pressure hydrogen storage units which contain a variable amount of the hydrogen storage alloy therein to enhance the storage capacity of the unit beyond that obtainable by pressurized hydrogen gas alone.

BACKGROUND OF THE INVENTION

Hydrogen is the "ultimate fuel" for the next millennium, and, it is inexhaustible. Hydrogen is the most plentiful element in the universe and can provide an inexhaustible, clean source of energy for our planet which can be produced by various processes which split water into hydrogen and oxygen. The hydrogen can be stored and transported in solid state form.

In the past considerable attention has been given to the use of hydrogen as a fuel or fuel supplement. While the world's oil reserves are depletable, the supply of hydrogen remains virtually unlimited. Hydrogen can be produced from coal, natural gas and other hydrocarbons, or formed by the electrolysis of water, preferably via energy from the sun which is composed mainly of hydrogen and can, itself, be thought of as a giant hydrogen "furnace". Moreover hydrogen can be produced without the use of fossil fuels, such as by the electrolysis of water using nuclear or solar energy, or any other form of economical energy (e.g., wind, waves, geothermal, etc.). Furthermore, hydrogen, is an inherently low cost fuel. Hydrogen has the highest density of energy per unit weight of any chemical fuel and is essentially non-polluting since the main by-product of "burning" hydrogen is water. Thus, hydrogen can be a means of solving many of the world's energy related problems, such as climate change, pollution, strategic dependancy on oil, etc., as well as providing a means of helping developing nations.

The earliest work at atomic engineering of hydrogen storage materials is disclosed by Stanford R. Ovshinsky (one of the present inventors) in U.S. Pat. No. 4,623,597 ("the '597 patent"), the contents of which are incorporated by reference. Ovshinsky, described disordered multicomponent hydrogen storage materials for use as negative electrodes in electrochemical cells for the first time. In this patent, Ovshinsky describes how disordered materials can be tailor made to greatly increase hydrogen storage and reversibility characteristics. Such disordered materials are formed of one or more of amorphous, microcrystalline, intermediate range order, or polycrystalline (lacking long range compositional order) wherein the polycrystalline material may include one or more of topological, compositional, translational, and positional modification and disorder, which can be designed into the material. The framework of active materials of these disordered materials consist of a host matrix of one or more elements and modifiers incorporated into this host matrix. The modifiers enhance the disorder of the resulting materials and thus create a greater number and spectrum of catalytically active sites and hydrogen storage sites.

The disordered electrode materials of the '597 patent were formed from lightweight, low cost elements by any number of techniques, which assured formation of primarily non-equilibrium metastable phases resulting in the high energy and power densities and low cost. The resulting low cost, high energy density disordered material allowed such Ovonic batteries to be utilized most advantageously as secondary batteries, but also as primary batteries and are used today worldwide under license from the assignee of the subject invention.

Tailoring of the local structural and chemical order of the materials of the '597 patent was of great importance to achieve the desired characteristics. The improved characteristics of the anodes of the '597 patent were accomplished by manipulating the local chemical order and hence the local structural order by the incorporation of selected modifier elements into a host matrix to create a desired disordered material. The disordered material had the desired electronic configurations which resulted in a large number of active sites. The nature and number of storage sites was designed independently from the catalytically active sites.

Multiorbital modifiers, for example transition elements, provided a greatly increased number of storage sites due to various bonding configurations available, thus resulting in an increase in energy density. The technique of modification especially provides non-equilibrium materials having varying degrees of disorder provided unique bonding configurations, orbital overlap and hence a spectrum of bonding sites. Due to the different degrees of orbital overlap and the disordered structure, an insignificant amount of structural rearrangement occurs during charge/discharge cycles or rest periods therebetween resulting in long cycle and shelf life.

The improved battery of the '597 patent included electrode materials having tailor-made local chemical environments which were designed to yield high electrochemical charging and discharging efficiency and high electrical charge output. The manipulation of the local chemical environment of the materials was made possible by utilization of a host matrix which could, in accordance with the '597 patent, be chemically modified with other elements to create a greatly increased density of catalytically active sites for hydrogen dissociation and also of hydrogen storage sites.

The disordered materials of the '597 patent were designed to have unusual electronic configurations, which resulted from the varying 3-dimensional interactions of constituent atoms and their various orbitals. The disorder came from compositional, positional and translational relationships of atoms. Selected elements were utilized to further modify the disorder by their interaction with these orbitals so as to create the desired local chemical environments.

The internal topology that was generated by these configurations also allowed for selective diffusion of atoms and ions. The invention that was described in the '597 patent made these materials ideal for the specified use since one could independently control the type and number of catalytically active and storage sites. All of the aforementioned properties made not only an important quantitative difference, but qualitatively changed the materials so that unique new materials ensued.

The disorder described in the '597 patent can be of an atomic nature in the form of compositional or configurational disorder provided throughout the bulk of the material or in numerous regions of the material. The disorder also can be introduced into the host matrix by creating microscopic phases within the material which mimic the compositional or configurational disorder at the atomic level by virtue of the relationship of one phase to another. For example, disordered materials can be created by introducing microscopic regions of a different kind or kinds of crystalline phases, or by introducing regions of an amorphous phase or phases, or by introducing regions of an amorphous phase or phases in addition to regions of a crystalline phase or phases. The interfaces between these various phases can provide surfaces which are rich in local chemical environments which provide numerous desirable sites for electrochemical hydrogen storage.

These same principles can be applied within a single structural phase. For example, compositional disorder is introduced into the material which can radically alter the material in a planned manner to achieve important improved and unique results, using the Ovshinsky principles of disorder on an atomic or microscopic scale.

One advantage of the disordered materials of the '597 patent were their resistance to poisoning. Another advantage was their ability to be modified in a substantially continuous range of varying percentages of modifier elements. This ability allows the host matrix to be manipulated by modifiers to tailor-make or engineer hydrogen storage materials with all the desirable characteristics, i.e., high charging/discharging efficiency, high degree of reversibility, high electrical efficiency, long cycle life, high density energy storage, no poisoning and minimal structural change.

Until the advent of the instant invention, no one has applied Ovshinsky's atomic engineering principals to provide low temperature hydrogen storage alloys that have extended storage capacity at higher pressures. Thus there remains a compelling and crucial need in the art for low temperature alloys which have extended storage capacity at higher pressures to thereby provide safe, efficient, reliable, cost effective alloys storing and delivering large quantities. The instant alloys and storage units in which they are used are made possible by the application of Ovshinsky's principles of atomic engineering, which create alloys having a spectrum of hydrogen bonding energies and multiple hydride phases.

SUMMARY OF THE INVENTION

The objects of the instant invention include a solid state hydrogen storage unit which includes a pressure containment vessel having at least one hydrogen inlet/outlet port for transferring hydrogen into and out of the vessel and a hydrogen storage alloy disposed with the containment vessel. The hydrogen storage alloy being in sufficient quantity to provide for bulk storage of hydrogen and having a storage capacity at ambient temperatures and at a pressure of at least two times the plateau endpoint pressure of at least 10% higher than the storage capacity of said alloy at the same temperature and at the plateau endpoint pressure.

More preferably, the hydrogen storage alloy has a storage capacity at ambient temperatures and at a pressure of at least three times the plateau endpoint pressure of at least 15% higher than the storage capacity of the alloy at the same temperature and at the plateau endpoint pressure. Even more preferred are alloys which have a storage capacity at ambient temperatures and at a pressure of at least four times the plateau endpoint pressure of at least 20% higher than the storage capacity of the alloy at the same temperature and at the plateau endpoint pressure. More preferred yet are alloys which have a storage capacity at ambient temperatures and at a pressure of at least five times the plateau endpoint pressure of at least 23% higher than the storage capacity of the alloy at the same temperature and at the plateau endpoint pressure. Most preferred are alloys which have a storage capacity at ambient temperatures and at a pressure of at least six times the plateau endpoint pressure of at least 25% higher than the storage capacity of the alloy at the same temperature and at the plateau endpoint pressure.

In an alternative embodiment, hydrogen storage alloy has a high pressure extended storage capacity slope of less than 5 at ambient temperature but greater than the slope of the plateau pressure capacity at the same temperature. More preferred alloys have a high pressure extended storage capacity curve slope of less than 4.5 at ambient temperature but greater than the slope of the plateau pressure capacity curve at the same temperature. Even more preferred alloys have a high pressure extended storage capacity curve slope of less than 4 at ambient temperature but greater than the slope of the plateau pressure capacity curve at the same temperature. Yet further preferred alloys are those which have a high pressure extended storage capacity curve slope of less than 3.5 at ambient temperature but greater than the slope of the plateau pressure capacity curve at the same temperature. Finally, most preferred alloys are those which have a high pressure extended storage capacity curve slope of less than 3 at ambient temperature but greater than the slope of the plateau pressure capacity curve at the same temperature.

Specifically the hydrogen storage alloy is an alloy is an $AB_2$ alloy, such as a modified Ti—$Mn_2$ alloy comprising, in atomic percent 2–5% Zr, 26–33% Ti, 7–13% V, 8–20% Cr, 36–42% Mn; and at least one element selected from the group consisting of 1–6% Ni, 2–6% Fe and 0.1–2% Al. The alloy may further contain up to 1 atomic percent Misch metal. Examples of such alloys include in atomic percent: 1) 3.63% Zr, 29.8% Ti, 8.82% V, 9.85% Cr, 39.5% Mn, 2.0% Ni, 5.0% Fe, 1.0% Al, and 0.4% Misch metal; 2) 3.6% Zr, 29.0% Ti, 8.9% V, 10.1% Cr, 40.1% Mn, 2.0% Ni, 5.1% Fe, and 1.2% Al; 3) 3.6% Zr, 28.3% Ti, 8.8% V, 10.0% Cr, 40.7% Mn, 1.9% Ni, 5.1% Fe, and 1.6% Al; and 4) 1% Zr, 33% Ti, 12.54% V, 15% Cr, 36% Mn, 2.25% Fe, and 0.21% Al.

The storage unit may further include a thermal management system for alternately cooling and heating said hydrogen storage alloy during charge and discharge thereof, respectively. The storage unity may also include means to divide the interior of the pressure vessel into compartments. The means to divide the interior of the pressure vessel into compartments may be selected from honeycomb structures, metal foam, disk dividers, screens, pinwheel dividers and combinations thereof.

BRIEF DESCRIPTION OF THE DRAWINIGS

DETAILED DESCRIPTION OF THE INVENTION

Figure 1:
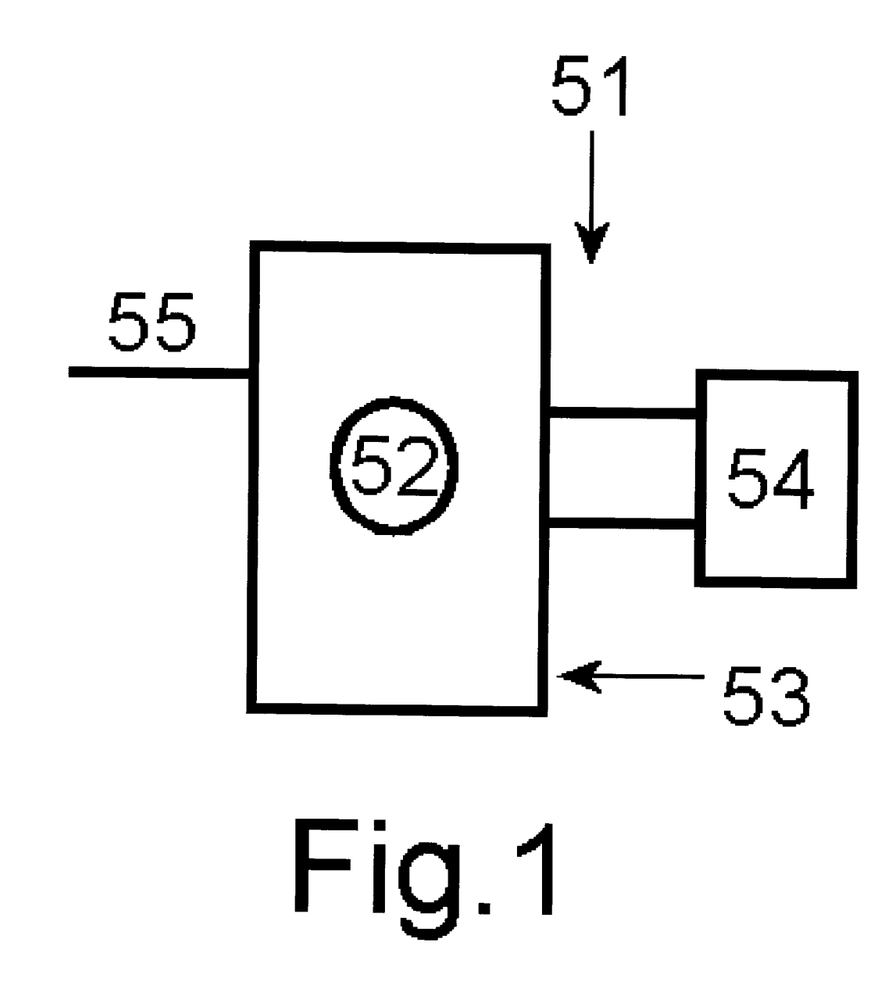
FIG. 1 is a stylistic depiction of the solid state hydrogen storage unit of the instant invention.

The instant invention consists of a solid state hydrogen storage unit and alloys useful therein. In it's simplest conceptual form, the storage unit 51 is shown in FIG. 1. The storage unit consists of a hydrogen storage alloy 52 disposed in a pressure containment vessel 53. The storage unit may also include a thermal management system 54, which alternately heats and cools the hydrogen storage alloy depending on whether it is being charged (the alloy is cooled) or stored hydrogen is being discharged (the alloy is heated). The storage unit also includes in input/output line 55 through which hydrogen is supplied to or removed from the hydrogen storage unit 51.

The thermal management system 54 can be any type of system known in the art, as long as it can add or remove heat from the storage alloy 52. While the thermal management system is depicted as a separate unit from the storage unit in FIG. 1, it need not be. In fact integration of the thermal management unit 54 will provide uniformity of heating and cooling. One type of integrated thermal management system that is particularly useful in the storage unit of the instant invention is disclosed in U.S. patent application Ser. No. 09/742,827, filed Dec. 20, 2000, and entitled "HYDROGEN STORAGE BED SYSTEM INCLUDING AN INTEGRATED THERMAL MANAGEMENT SYSTEM", the disclosure of which is incorporated herein by reference.

The pressure container 53 can be formed from any material or materials that contains the equilibrium and charging pressures of hydrogen at the operating temperatures of the storage unit 51. The materials must also be non-reactive with the stored hydrogen and the hydrogen storage alloy 52 and must withstand the typical operating temperatures of the system. The materials must also prevent hydrogen diffusion therethrough and be immune to hydrogen embrittlement over the lifetime of the container. The temperatures and pressures will of course depend on the particular storage alloy 52 that is used. Typically for the alloys disclosed herein, the pressures can range up to 500 bar, and temperatures will range up to 200° C. Typical construction materials for the pressure container 53 can include metals such as stainless steels. The pressure container 53 can also be made thermally insulating by constructing the container out of insulating materials or by insulating the exterior or interior of a thermally conductive material such as a metal. Whether or not the pressure container 53 is insulated will depend on whether or not external heating and cooling through the pressure container are employed. If there is external heating and cooling, then insulating the pressure container 53 would defeat the purpose thereof. The pressure container 53 can also be made of fiber reinforced polymeric materials such as carbon fiber reinforced epoxy materials, etc., alone or in conjunction with other materials (i.e. a multilayer pressure container). The advantage of such fiber reinforced polymer and multilayer construction materials is savings in weight.

Figure 2:
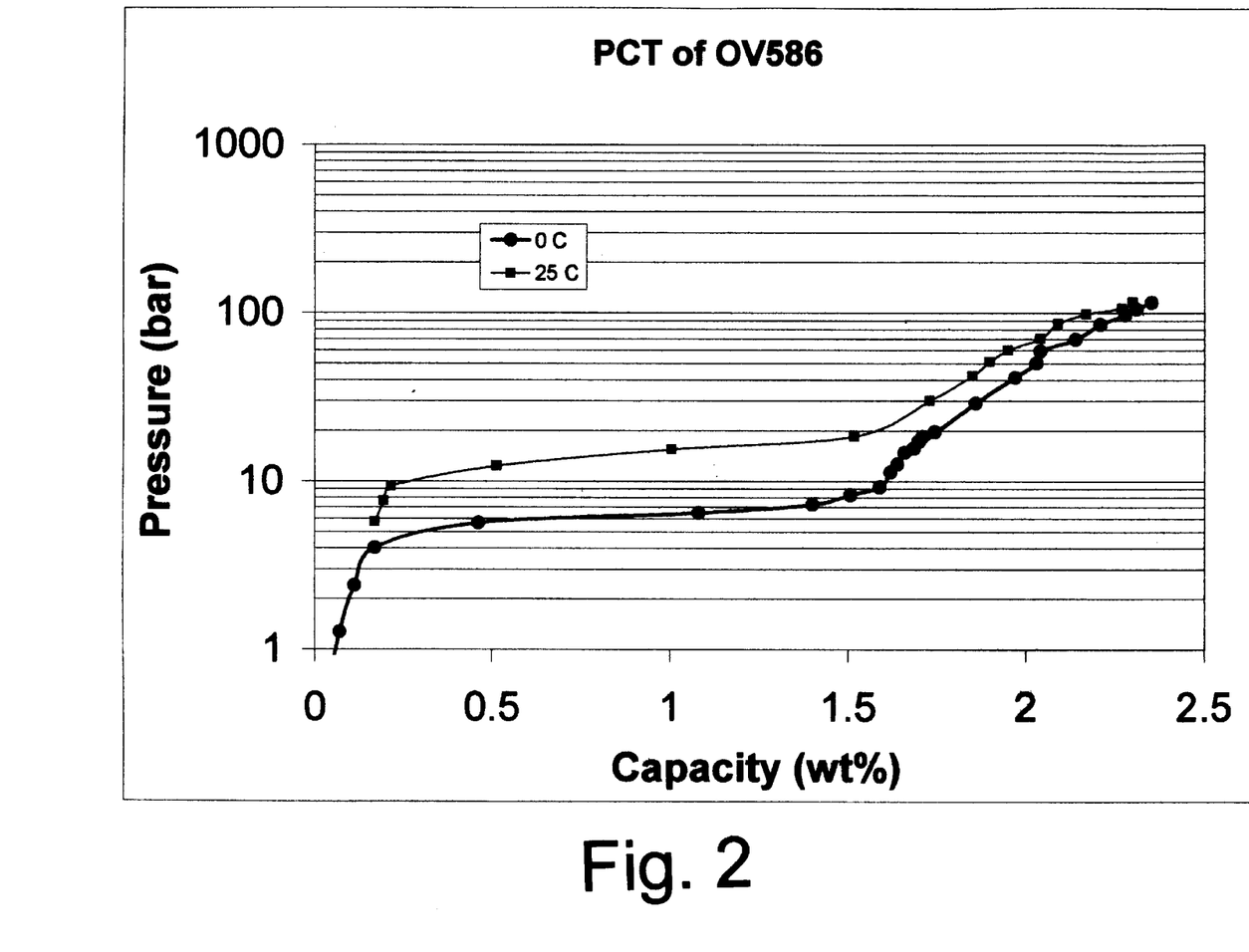
FIG. 2 is a pressure-composition-temperature (PCT) plot at 0° C. and 25° C. of an alloy useful in the storage unit of the instant invention.

Generally the bulk hydrogen storage alloys 52 which are useful in the storage unit of the instant invention are those which have a storage capacity at ambient temperatures and at a pressure of at least two times the plateau endpoint pressure of at least 10% higher than the storage capacity of said alloy at the same temperature and at the plateau endpoint pressure. These terms can be best described in reference to FIG. 2 which is a PCT plot for an alloy (OV586, the composition of which is disclosed in Table 1, below) of the instant invention. FIG. 2 plots the equilibrium hydrogen pressure versus storage capacity of the alloy for 2 different temperatures: 0° C. (symbol ●) and 25° C. (symbol ■). A purview of the curves show a relatively flat horizontal portion which is called the "plateau pressure". This plateau pressure is not a constant pressure, but the pressure change over a relatively large capacity increase is minimal. Then, as the amount of stored hydrogen increases beyond a certain value, the slope of the curve changes and the pressure rises much more for a given capacity increase. It should be noted that while the plateau pressure of the instant example is relatively flat, the plateau portion of the PCT curve of some alloys may be quite sloped and still the material will be within the purview of the instant invention. Thus, what is important is the pressure at the point at which the slope of the curve changes. This point is herein designated as the "plateau endpoint pressure." As used herein, ambient temperatures are between about −20° C. and 50° C. (i.e. a range of typical outdoor temperatures throughout the year). Thus, at typical ambient temperatures, the storage alloys of the instant invention have additional storage capacity beyond the capacity at the plateau endpoint pressure. This additional capacity is at least 10% higher than the storage capacity of the alloy at the same temperature and at the plateau endpoint pressure.

More preferably, the hydrogen storage alloy has a storage capacity at ambient temperatures and at a pressure of at least three times the plateau endpoint pressure of at least 15% higher than the storage capacity of said alloy at the same temperature and at the plateau endpoint pressure. Even more preferred are alloys which have a storage capacity at ambient temperatures and at a pressure of at least four times the plateau endpoint pressure of at least 20% higher than the storage capacity of said alloy at the same temperature and at the plateau endpoint pressure. More preferred yet are alloys which have a storage capacity at ambient temperatures and at a pressure of at least five times the plateau endpoint pressure of at least 23% higher than the storage capacity of said alloy at the same temperature and at the plateau endpoint pressure. Most preferred are alloys which have a storage capacity at ambient temperatures and at a pressure of at least six times the plateau endpoint pressure of at least 25% higher than the storage capacity of said alloy at the same temperature and at the plateau endpoint pressure.

Figure 3:
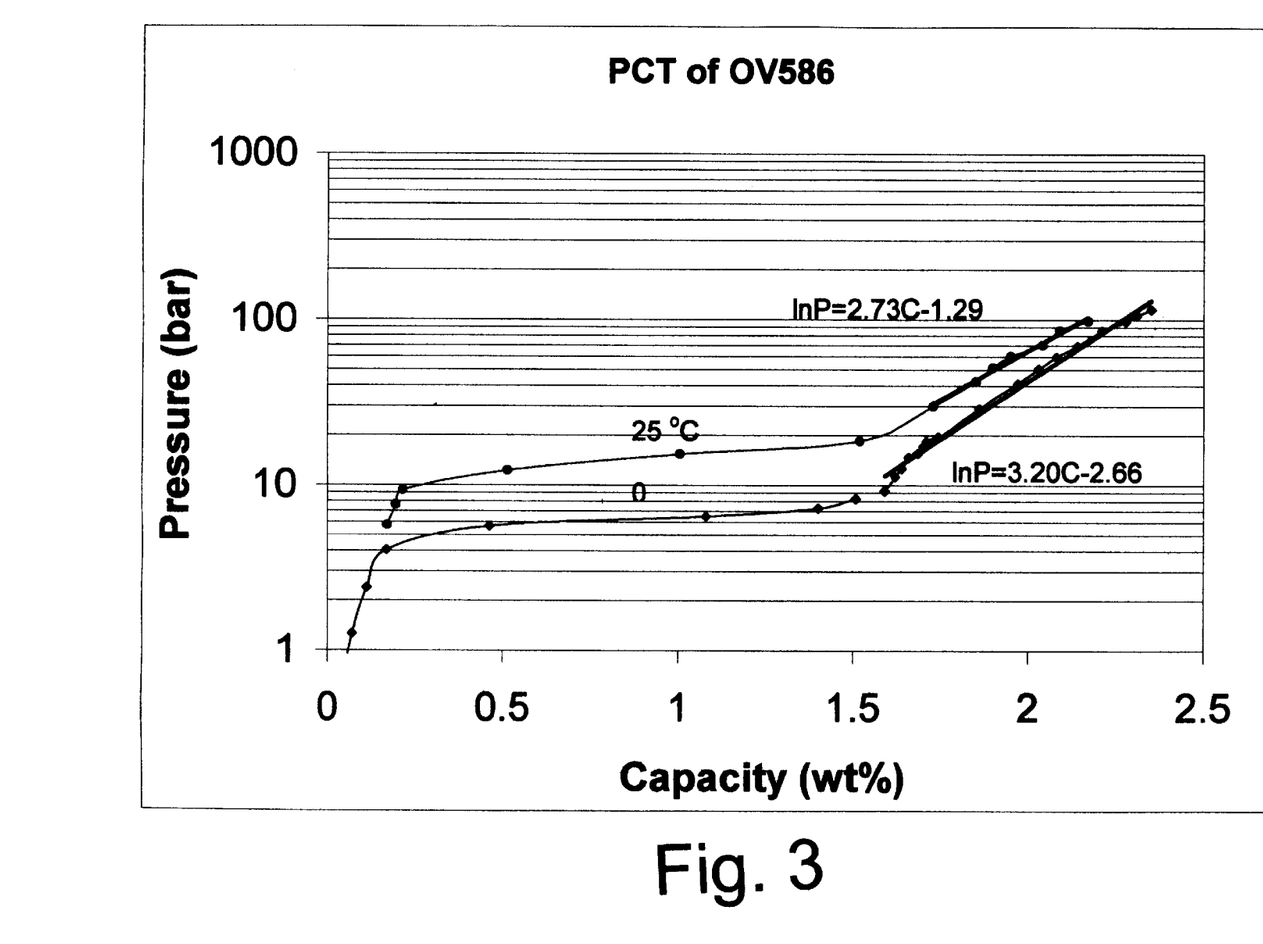
FIG. 3 is the same PCT plot of FIG. 2 specifically showing the linear relationship between the natural log of pressure versus extended capacity for an alloy useful in the storage unit of the instant invention.

In the alternative, bulk hydrogen storage alloys 52 which are useful in the storage unit of the instant invention are those which have a high pressure extended storage capacity curve slope of less than 5 at ambient temperature but greater than the slope of the plateau pressure capacity curve at the same temperature. Here reference to FIG. 3 will be useful in understanding and defining these terms. FIG. 3 is the same PCT curve as FIG. 2. The extended capacity is the region of the capacity/pressure curve beyond the plateau endpoint pressure. As can be seen from FIG. 3, this portion of the curve can be fit to a line having the formula Ln(P)=M(C)+B. That is, the fitted line plots the hydrogen storage capacity (C) versus the natural log of the pressure (P), wherein M is the slope of the fitted line and B is the natural log of the pressure intercept of the line. The slope of this line is very important. If the slope of the line is too high, there is very little high pressure extended storage capacity. If the slope of the line is too low, it will be indistinguishable from the sloped plateau storage region of the graph (thus, there will be no "extended" capacity, and all of the capacity will be plateau capacity). Thus while there is no theoretical upper limit on the slope of the extended capacity line, practical limitations set an upper limit of about 5 on the slope.

For the specific PCT curves for alloy OV586 plotted in FIG. 3, the extended capacity curves of the PCT curves at 0° C. (symbol ♦) and 25° C. (symbol ●) have been fitted to lines having the formula Ln(P)=M(C)+B. For 0° C. the best fit line is Ln(P)=3.20(C)−2.66 and for 25° C. the best fit line is Ln(P)=2.73(C)−1.29.

In practical applications, the smaller the slope of the line, the greater the storage enhancement for a given pressure increase. Thus, more preferred alloys have a high pressure extended storage capacity curve slope of less than 4.5 at ambient temperature but greater than the slope of the plateau pressure capacity curve at the same temperature. Even more preferred alloys have a high pressure extended storage capacity curve slope of less than 4 at ambient temperature but greater than the slope of the plateau pressure capacity curve at the same temperature. Yet further preferred alloys are those which have a high pressure extended storage capacity curve slope of less than 3.5 at ambient temperature but greater than the slope of the plateau pressure capacity curve at the same temperature. Finally, most preferred alloys are those which have a high pressure extended storage capacity curve slope of less than 3 at ambient temperature but greater than the slope of the plateau pressure capacity curve at the same temperature.

Figure 4:
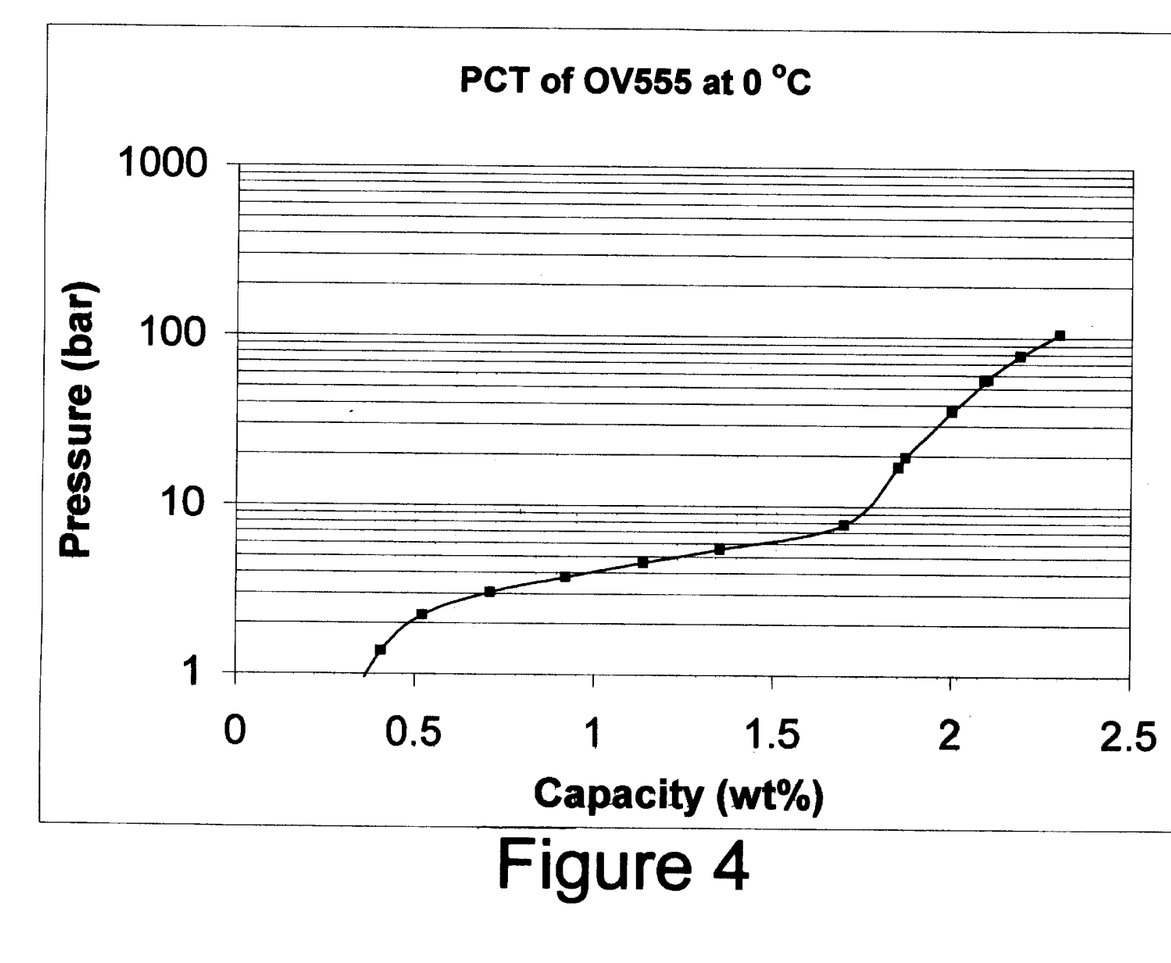
FIG. 4 is a pressure-composition-temperature (PCT) plot at 0° C. of another alloy useful in the storage unit of the instant invention.
Figure 5:
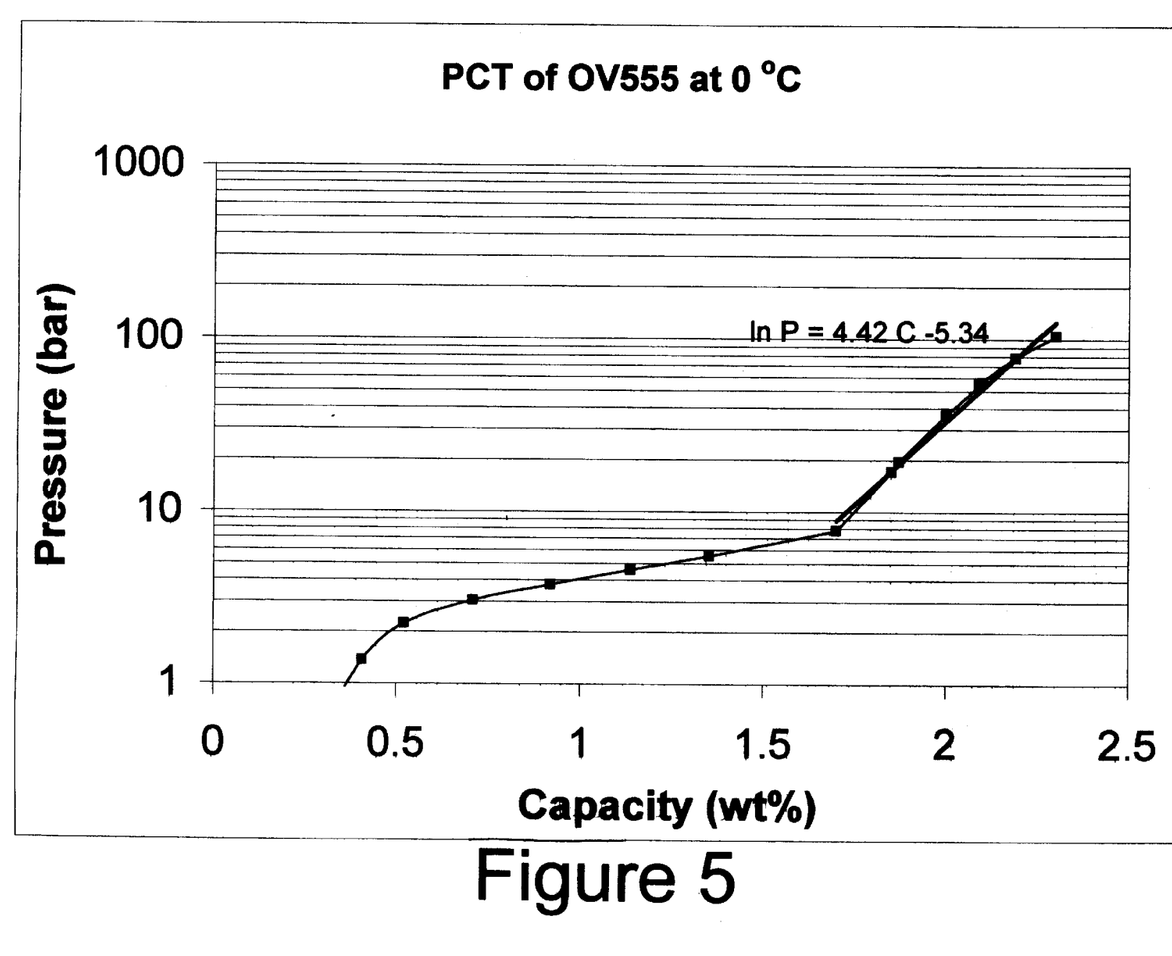
FIG. 5 is the same PCT plot of FIG. 3 specifically showing the linear relationship between the natural log of pressure versus extended capacity for another alloy useful in the storage unit of the instant invention.

FIG. 4 which is a PCT plot similar to FIG. 2 but for another alloy (OV555, the composition of which is disclosed in Table 1, below) of the instant invention. FIG. 4 plots the equilibrium hydrogen pressure versus storage capacity of the alloy at 0° C. FIG. 5 is the same PCT curve as FIG. 4. As can be seen from FIG. 5, the extended capacity region of the curve can again be fit to a line having the formula Ln(P)=M(C)+B. In this case the line has the formula Ln(P)=4.42(C)−5.34.

While not wishing to be bound by theory, the inventors believe that the useful extended capacity at higher pressures exhibited by the alloys of the instant invention are attributable to the atomic engineering of the alloy. That is, the alloys have been designed with multiple alloying ingredients to provide a spectrum of hydrogen bonding energies. Thus multiple hydride phases are present, some of which are accessible at higher pressures, thereby extending the storage capacity of the alloys. This extended capacity is not available in alloys which have not been thus atomically engineered. Particularly, non-engineered AB₅ alloys do not show this extended storage capacity. For these alloys, the slope of the extended storage line is on the order of 10 to 20. Thus almost no additional capacity can be achieved no matter how much pressure is applied to the adsorbing hydrogen.

Useful hydrogen storage alloys are generally $AB_2$ alloys and more specifically are modified $TiMn_2$ alloys. A specific alloy family useful for the storage unit of the instant invention is, in atomic percent, 2–5% Zr, 26–33% Ti, 7–13% V, 8–20% Cr, 36–42% Mn; and at least one element selected from the group consisting of 1–6% Ni, 2–6% Fe and 0.1–2% Al. The alloys may also contain up to about 1 atomic percent Misch metal (Mm). Three specific alloys which fall within this family are (in atomic percent):

TABLE 1

| Alloy | Zr | Ti | V | Cr | Mn | Ni | Fe | Al | Mm |
|---|---|---|---|---|---|---|---|---|---|
| Ov539 | 3.63 | 29.8 | 8.82 | 9.85 | 39.5 | 2.0 | 5.0 | 1.0 | 0.4 |
| Ov555 | 1 | 33 | 12.54 | 15 | 36 | — | 2.25 | 0.21 | — |
| Ov586 | 3.6 | 29.0 | 8.9 | 10.1 | 40.1 | 2.0 | 5.1 | 1.2 | — |
| Ov587 | 3.6 | 28.3 | 8.8 | 10.0 | 40.7 | 1.9 | 5.1 | 1.6 | — |

While the alloys of the instant invention can be pyrophoric, they can be non-pyrophoric, if needed, using the principles of atomic engineering disclosed by Ovshinsky et al. in U.S. patent application Ser. No. 09/873,863, to Ovshinsky et al., filed Jun. 4, 2001 entitled "NON-PYROPHORIC HYDROGEN STORAGE ALLOYS", the disclosure of which is incorporated herein by reference.

It should be noted that the storage unit of the instant invention need not be fully loaded with storage alloy. Some of the volume of the pressure vessel may be left void and hydrogen will be stored therein in a compressed form. That is, a trade-off between total storage capacity and weight/cost can be made. Thus, some consumer applications may benefit from a smaller amount of storage alloy due to a reduction in weight and cost, while other applications may benefit from much higher capacity by inclusion of more storage alloy within the unit, even given the added weight and cost. Thus 1 to 100 volume percent of the available internal volume (i.e. minus dividers and thermal management systems) may be filled with storage material depending on consumer needs. In any case, regardless of the amount of storage alloy used, all units will gain the added benefit of the extended storage capacity of the instant alloys.

The storage unit of the instant invention may further include means to divide the interior of the pressure vessel into compartments. This is well known in the prior art. This compartmentalization helps to prevent the hydrogen storage alloy from becoming unevenly distributed. This can happen when the storage alloy powders settle during use. This settling can cause dense spots which could cause bulging and or breaking of the pressure vessel during expansion on charging of the alloy. Thus to reduce the possibility of this occurring, the storage material can be divided into separate compartments. While any means known in the art can be used for dividing the internal volume of the pressure vessel, specific means include honeycomb structures, metal foam, disk dividers, screens, pinwheel dividers and combinations thereof.

Figure 6:
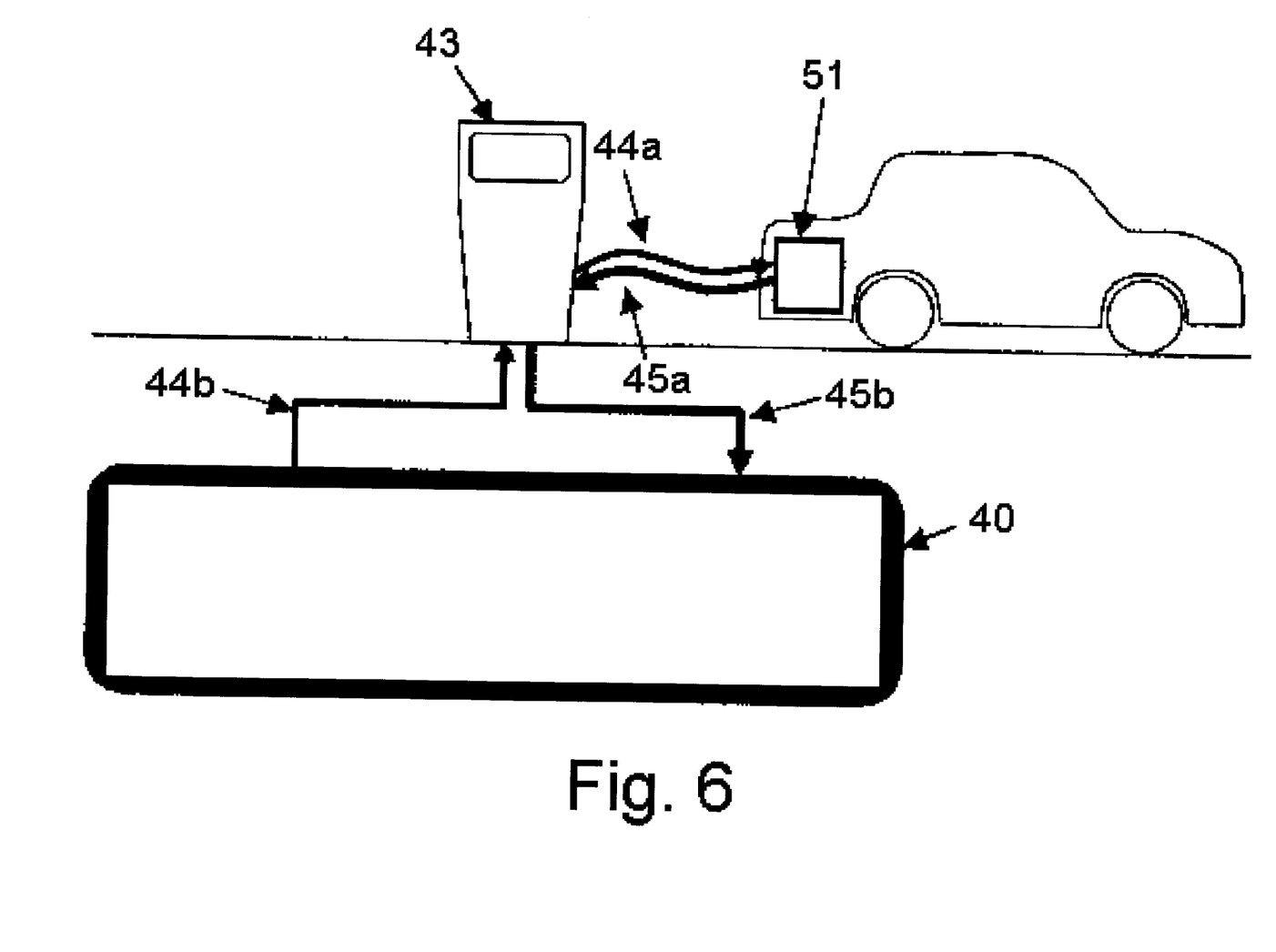
FIG. 6 is a stylistic depiction of a hydrogen refueling station for refueling the storage unit of the instant invention.

FIG. 6 is a stylistic depiction of a hydrogen refueling station which specifically shows how hydrogen can be pumped from a station storage tank 40 (which may also be serving as a solid state single stage compressor), and waste heat of hydride formation which is produced within a vehicles storage unit (i.e. the storage unit of the instant invention) 51 is captured and transferred to the stations storage bed 40 to assist in heating the hydrogen storage alloy for compression and/or release of hydrogen therefrom. Specifically, high pressure hydrogen is dispensed from the meter 43 into the vehicle's hydrogen storage bed 51 through hydrogen supply line 44a. Some or all of the hydrogen is absorbed into the hydrogen storage material within the bed 51, thereby releasing heat of hydride formation. This heat is removed either by excess hydrogen flow or some other form of cooling such as cooling water, etc. Heat leaves storage bed 51 and is transported to the meter 43 via hot coolant return line 45a. The coolant is then transported from the meter 43 to the stations hydrogen storage bed 40 via hot coolant return line 45b. The hot coolant releases its heat into the hydrogen storage material within bed 40 to assist in providing the required heat (heat of dehydriding) to maintain the proper compression and/or release the stored hydrogen therein. The released hydrogen, is supplied to the meter 43, via hydrogen supply line 44b, to ultimately be sent to the vehicles hydrogen storage bed 51. This set up allows for very fast charging of a vehicles storage bed 51 at high pressures, and yet eliminates waste of the released heat and overheating of the bed 51.

It should be noted that while the hydrogen refueling station was described in relation to heating the stations compressor/storage bed 40 using the waste heat from the vehicle's storage tank, other sources of heating the compressor/storage bed and cooling the vehicle's storage tank can be used. For example, if hydrogen is being produced on-site via a reformation process, the waste heat from the reformation process can be used to heat the compressor. Natural gas or electric heat are also usable if no waste heat is available. Additionally, water can be used to cool the vehicle's storage tank, such as for example the refueling station's city water supply, etc.

Hydrogen Powered Internal Combustion Engine and Fuel Cell Vehicles

The instant alloys, storage material systems and infrastructure are useful as hydrogen supplies for many applications. One such application is the field of automobiles. Specifically, infrastructure system can be used as a means to supply hydrogen to automobiles and the storage systems can be used as a source of hydrogen for internal combustion engine (ICE) or fuel cell (FC) of such vehicles.

Figure 7:
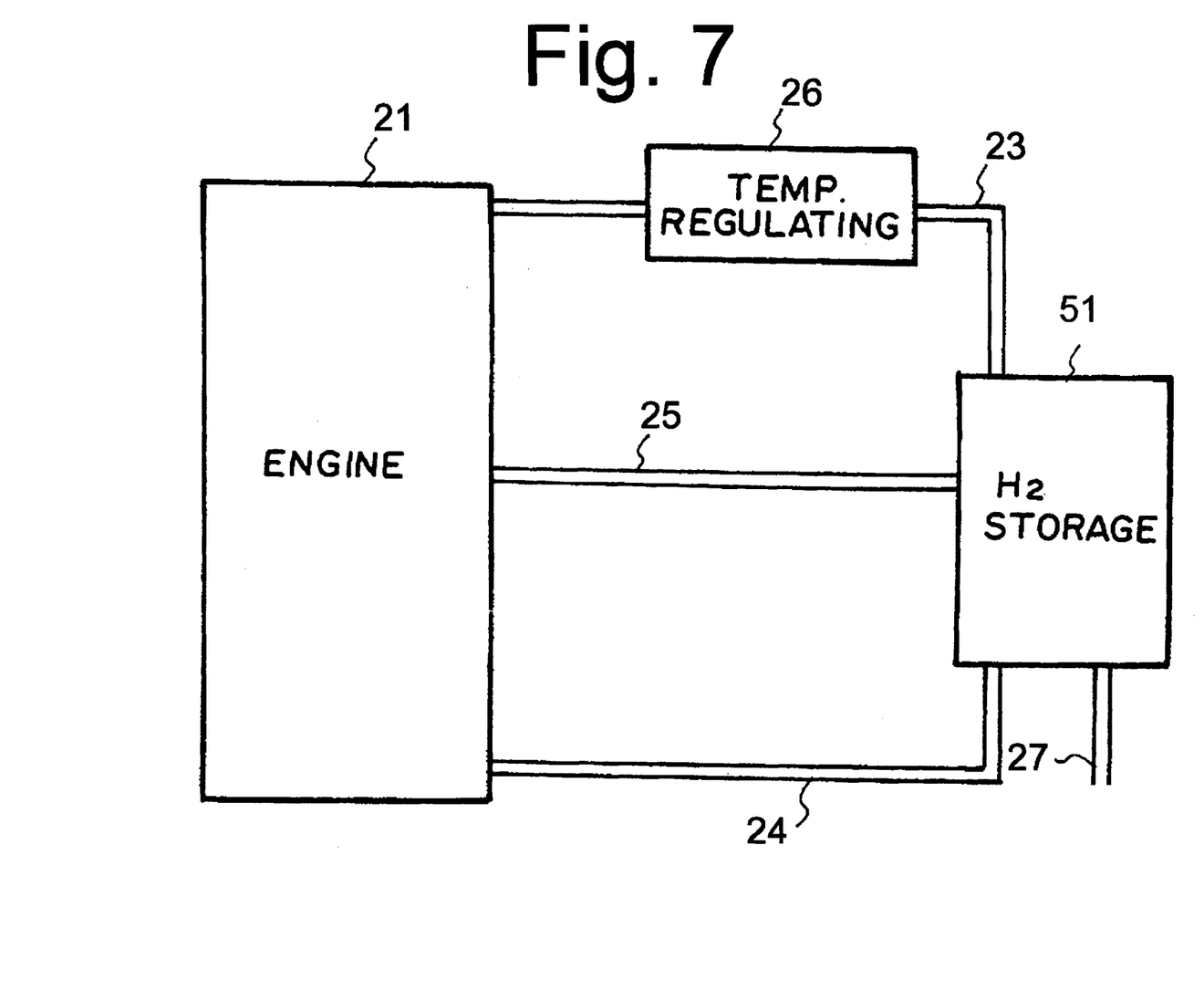
FIG. 7 shows a schematic representation of a hydrogen gas supply system for powering an internal combustion engine vehicle.

FIG. 7 shows a schematic representation of a hydrogen gas supply system for an ICE (internal combustion engine) vehicle, which is for supplying a hydrogen engine 21 with hydrogen gas. The system has a hydrogen gas storage unit 51 and an engine waste heat transfer supply passage 23 which leads engine waste heat (in the form of exhaust gas or engine coolant) discharged from the engine 21 to the hydrogen gas storage unit 51. The system also includes a return passage 24 for returning any engine coolant used to heat the hydrogen storage material back to the engine 21 and an exhaust gas vent 27 for releasing used exhaust gas. The system further includes a hydrogen gas supply passage 25 which leads hydrogen gas from the hydrogen gas storage unit 51 to the engine 21. The engine waste heat transfer supply passage 23 is provided with a temperature regulating portion 26 which regulates the temperature of the waste heat to be introduced into the hydrogen gas storage unit 51. With such a system, waste heat generated within the ICE can be efficiently used to heat the hydrogen storage material to release hydrogen therefrom for use in the ICE.

Figure 8:
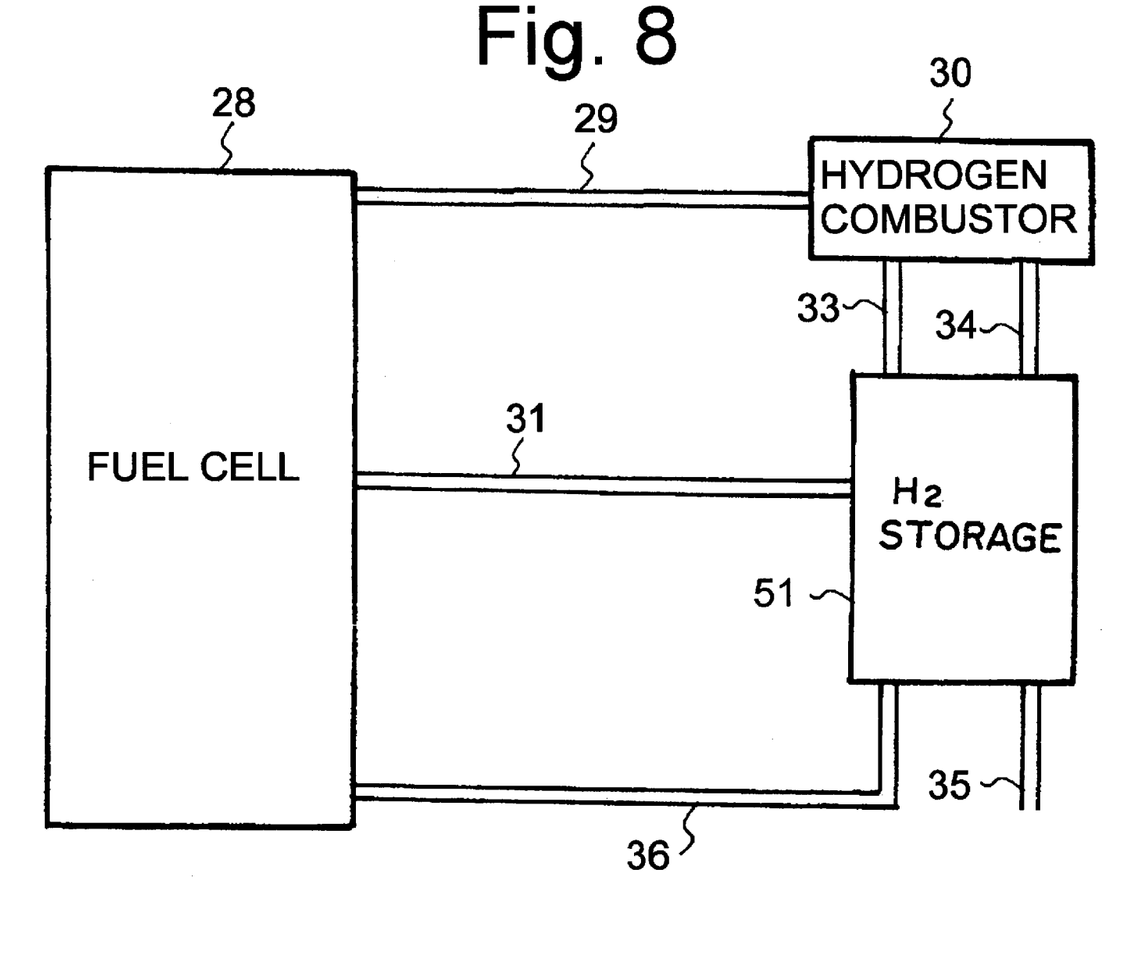
FIG. 8 shows a schematic representation of a hydrogen gas supply system for powering for a fuel c ell vehicle.

FIG. 8 shows a schematic representation of a hydrogen gas supply system for an FC (fuel cell) vehicle, which is for supplying a fuel cell 28 with hydrogen gas. The system has a hydrogen gas storage unit 51 and a fuel cell waste heat/hydrogen transfer supply passage 29 which leads fuel cell waste heat and unused hydrogen discharged from the fuel cell 28 to a hydrogen gas combustor 30. Waste heat from the fuel cell may be in the form of heated gases or heated aqueous electrolyte. The hydrogen combustor 30, heats a thermal transfer medium (preferably in the form of the aqueous electrolyte from the fuel cell) utilizing waste heat from the fuel cell 28, and by combusting hydrogen. Hydrogen is supplied to the combustor 30 via unused hydrogen from the fuel cell 28, and via fresh hydrogen supplied from the hydrogen storage unit 51 via hydrogen supply line 34. Heated thermal transfer medium is supplied to the hydrogen storage unit 51 via supply line 33. The system also includes a return passage 36 for returning any fuel cell aqueous electrolyte used to heat the hydrogen storage material back to the fuel cell 28 and an exhaust gas vent 35 for releasing used combustor gas. The system further includes a hydrogen gas supply passage 31 which leads hydrogen gas from the hydrogen gas storage unit 51 to the fuel cell 28.

While the invention has been described in connection with preferred embodiments and procedures, it is to be understood that it is not intended to limit the invention to the described embodiments and procedures. On the contrary it is intended to cover all alternatives, modifications and equivalence which may be included within the spirit and scope of the invention as defined by the claims appended hereinafter.

We claim:

1. A solid state hydrogen storage unit comprising:
   a) a pressure containment vessel, said pressure containment vessel having at least one hydrogen inlet/outlet port for transferring hydrogen into and out of said pressure containment vessel;
   b) a hydrogen storage alloy having a plateau endpoint pressure being disposed within said pressure containment vessel, said hydrogen storage alloy providing for bulk storage of hydrogen and said hydrogen storage alloy having a hydrogen storage capacity, wherein said hydrogen storage capacity of said hydrogen storage alloy increases by at least 10% at a pressure of at least twice said plateau endpoint pressure.

2. The solid state hydrogen storage unit of claim 1, wherein said hydrogen storage capacity of said hydrogen storage alloy increases by at least 15% at a pressure of at least three times said plateau endpoint pressure.

3. The solid state hydrogen storage unit of claim 1, wherein said hydrogen storage capacity of said hydrogen storage alloy increases by at least 20% at a pressure of at least four times said plateau endpoint pressure.

4. The solid state hydrogen storage unit of claim 1, wherein said hydrogen storage capacity of said hydrogen storage alloy increases by at least 23% at a pressure of at least five times said plateau endpoint pressure.

5. The solid state hydrogen storage unit of claim 1, wherein said hydrogen storage capacity of said hydrogen storage alloy increases by at least 25% at a pressure of at least six times said plateau endpoint pressure.

6. The solid state hydrogen storage unit of claim 1, wherein said unit further includes a thermal management system for alternately cooling and heating said hydrogen storage alloy during charge and discharge thereof, respectively.

7. The solid state hydrogen storage unit of claim 1, wherein said hydrogen storage alloy comprises an $AB_2$ alloy.

8. The solid state hydrogen storage unit of claim 7, wherein said hydrogen storage alloy comprises a modified Ti—$Mn_2$ alloy.

9. The solid state hydrogen storage unit of claim 8, wherein said hydrogen storage alloy comprises, in atomic percent 2–5% Zr, 26–33% Ti, 7–13% V, 8–20% Cr, 36–42% Mn; and at least one element selected from the group consisting of 1–6% Ni, 2–6% Fe and 0.1–2% Al.

10. The solid state hydrogen storage unit of claim 9, wherein said hydrogen storage alloy further comprises up to 1 atomic percent Misch metal.

11. The solid state hydrogen storage unit of claim 10, wherein said hydrogen storage alloy comprises, in atomic percent 3.63% Zr, 29.8% Ti, 8.82% V, 9.85% Cr, 39.5% Mn, 2.0% Ni, 5.0% Fe, 1.0% Al, and 0.4% Misch metal.

12. The solid state hydrogen storage unit of claim 9, wherein said hydrogen storage alloy comprises, in atomic percent 3.6% Zr, 29.0% Ti, 8.9% V, 10.1% Cr, 40.1% Mn, 2.0% Ni, 5.1% Fe, and 1.2% Al.

13. The solid state hydrogen storage unit of claim 9, wherein said hydrogen storage alloy comprises, in atomic percent 3.6% Zr, 28.3% Ti, 8.8% V, 10.0% Cr, 40.7% Mn, 1.9% Ni, 5.1% Fe, and 1.6% Al.

14. The solid state hydrogen storage unit of claim 9, wherein said hydrogen storage alloy comprises, in atomic percent 1% Zr, 33% Ti, 12.54% V, 15% Cr, 36% Mn, 2.25% Fe, and 0.21% Al.

15. The solid state hydrogen storage unit of claim 1, wherein said unit further includes means to divide the interior of said pressure containment vessel into compartments.

16. The solid state hydrogen storage unit of claim 15, wherein means to divide the interior of said pressure containment vessel into compartments is selected from the group consisting of honeycomb structures, metal foam, disk dividers, screens, pinwheel dividers and combinations thereof.

17. A hydrogen storage alloy having a hydrogen storage capacity and a plateau endpoint pressure, wherein said hydrogen storage capacity of said hydrogen storage alloy increases by at least 10% at a pressure of at least twice said plateau endpoint pressure.

18. The hydrogen storage alloy of claim 17, wherein said hydrogen storage capacity of said hydrogen storage alloy increases by at least 15% at a pressure of at least three times said plateau endpoint pressure.

19. The hydrogen storage alloy of claim 17, wherein said hydrogen storage capacity of said hydrogen storage alloy increases by at least 20% at a pressure of at least four times said plateau endpoint pressure.

20. The hydrogen storage alloy of claim 17, wherein said hydrogen storage capacity of said hydrogen storage alloy increases by at least 23% at a pressure of at least five times said plateau endpoint pressure.

21. The hydrogen storage alloy of claim 17, wherein said hydrogen storage capacity of said hydrogen storage alloy increases by at least 25% at a pressure of at least six times said plateau endpoint pressure.

22. A solid state hydrogen storage unit comprising:
a) a pressure containment vessel, said pressure containment vessel having at least one hydrogen inlet/outlet port for transferring hydrogen into and out of said vessel;
b) a hydrogen storage alloy disposed within said pressure containment vessel, said hydrogen storage alloy providing for bulk storage of hydrogen and said hydrogen storage alloy having a plateau pressure capacity slope and a high pressure extended storage capacity slope of less than 5 but greater than said plateau pressure capacity slope.

23. The solid state hydrogen storage unit of claim 22, wherein said high pressure extended storage capacity slope is less than 4.5 but greater than said plateau pressure capacity slope.

24. The solid state hydrogen storage unit of claim 22, wherein said high pressure extended storage capacity slope is less than 4 but greater than said plateau pressure capacity slope.

25. The solid state hydrogen storage unit of claim 22, wherein said high pressure extended storage capacity slope is less than 3.5 but greater than said plateau pressure capacity slope.

26. The solid state hydrogen storage unit of claim 22, wherein said high pressure extended storage capacity slope is less than 3 but greater than said plateau pressure capacity slope.

27. The solid state hydrogen storage unit of claim 22, wherein said unit further includes a thermal management system for alternately cooling and heating said hydrogen storage alloy during charge and discharge thereof, respectively.

28. The solid state hydrogen storage unit of claim 22, wherein said hydrogen storage alloy comprises an $AB_2$ alloy.

29. The solid state hydrogen storage unit of claim 28, wherein said hydrogen storage alloy comprises a modified Ti—$Mn_2$ alloy.

30. The solid state hydrogen storage unit of claim 29, wherein said hydrogen storage alloy comprises, in atomic percent 2–5% Zr, 26–33% Ti, 7–13% V, 8–20% Cr, 36–42% Mn; and at least one element selected from the group consisting of 1–6% Ni, 2–6% Fe and 0.1–2% Al.

31. The solid state hydrogen storage unit of claim 30, wherein said hydrogen storage alloy further comprises up to 1 atomic percent Misch metal.

32. The solid state hydrogen storage unit of claim 31, wherein said hydrogen storage alloy comprises, in atomic percent 3.63% Zr, 29.8% Ti, 8.82% V, 9.85% Cr, 39.5% Mn, 2.0% Ni, 5.0% Fe, 1.0% Al, and 0.4% Misch metal.

33. The solid state hydrogen storage unit of claim 30, wherein said hydrogen storage alloy comprises, in atomic percent 3.6% Zr, 29.0% Ti, 8.9% V, 10.1% Cr, 40.1% Mn, 2.0% Ni, 5.1 % Fe, and 1.2% Al.

34. The solid state hydrogen storage unit of claim 30, wherein said hydrogen storage alloy comprises, in atomic percent 3.6% Zr, 28.3% Ti, 8.8% V, 10.0% Cr, 40.7% Mn, 1.9% Ni, 5.1% Fe, and 1.6% Al.

35. The solid state hydrogen storage unit of claim 30, wherein said hydrogen storage alloy comprises, in atomic percent 1% Zr, 33% Ti, 12.54% V, 15% Cr, 36% Mn, 2.25% Fe, and 0.21% Al.

36. The solid state hydrogen storage unit of claim 22, wherein said unit further includes means to divide the interior of said pressure containment vessel into compartments.

37. The solid state hydrogen storage unit of claim 36, wherein means to divide the interior of said pressure containment vessel into compartments is selected from the group consisting of honeycomb structures, metal foam, disk dividers, screens, pinwheel dividers and combinations thereof.

38. A hydrogen storage alloy having a plateau pressure capacity slope and a high pressure extended storage capacity slope of less than 5 but greater than the slope of said plateau pressure capacity.

39. The hydrogen storage alloy of claim 38, wherein said high pressure extended storage capacity slope is less than 4.5 but greater than said plateau pressure capacity slope.

40. The hydrogen storage alloy of claim 38, wherein said high pressure extended storage capacity slope is less than 4 but greater than said plateau pressure capacity slope.

41. The hydrogen storage alloy of claim 38, wherein said high pressure extended storage capacity slope is less than 3.5 but greater than said plateau pressure capacity slope.

42. The hydrogen storage alloy of claim 38, wherein said high pressure extended storage capacity slope is less than 3 but greater than said plateau pressure capacity slope.

* * * * *